US011673205B2

(12) United States Patent
Lee et al.

(10) Patent No.: US 11,673,205 B2
(45) Date of Patent: Jun. 13, 2023

(54) BATTERY MODULE HAVING BUS BAR, AND BATTERY PACK

(71) Applicant: LG CHEM, LTD., Seoul (KR)

(72) Inventors: Kwang-Bae Lee, Daejeon (KR); Kun-Joo Yang, Daejeon (KR); Seog-Jin Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 536 days.

(21) Appl. No.: 16/648,139

(22) PCT Filed: Jan. 22, 2019

(86) PCT No.: PCT/KR2019/000920
§ 371 (c)(1),
(2) Date: Mar. 17, 2020

(87) PCT Pub. No.: WO2019/203426
PCT Pub. Date: Oct. 24, 2019

(65) Prior Publication Data
US 2020/0280040 A1    Sep. 3, 2020

(30) Foreign Application Priority Data

Apr. 20, 2018  (KR) .................. 10-2018-0046147

(51) Int. Cl.
*B23K 11/14*    (2006.01)
*B23K 35/02*    (2006.01)
(Continued)

(52) U.S. Cl.
CPC .............. *B23K 11/14* (2013.01); *B23K 35/02* (2013.01); *H01M 50/213* (2021.01);
(Continued)

(58) Field of Classification Search
CPC .. H01M 20/502; H01M 50/528; H01M 50/20; H01M 50/505; H01M 50/244;
(Continued)

(56) References Cited

U.S. PATENT DOCUMENTS

| 6,703,158 B1 | 3/2004 | Hirano | |
|---|---|---|---|
| 2005/0079408 A1* | 4/2005 | Hirano | ................. B60L 50/64 |
| | | | 429/174 |

(Continued)

FOREIGN PATENT DOCUMENTS

| CN | 102569709 A | 7/2012 |
|---|---|---|
| CN | 206022495 U | 3/2017 |

(Continued)

OTHER PUBLICATIONS

Office Action dated Dec. 28, 2021, issued in corresponding Chinese Patent Application No. 201980005202.6.

(Continued)

*Primary Examiner* — Brian W Jennison
(74) *Attorney, Agent, or Firm* — Morgan, Lewis & Bockius LLP

(57) ABSTRACT

A battery module includes cylindrical battery cells, a module housing, and a bus bar. The bus bar includes a main body portion that is positioned at a top or a bottom of the plurality of cylindrical battery cells and has a plate shape having upper and lower surfaces that are broader than a lateral surface of the main body portion in a horizontal direction; and a contact portion that is configured to electrically contact and be connected to an electrode terminal formed in one of the plurality of cylindrical battery cells, extends and protrudes from the main body portion in a horizontal direction, is stepped from the main body portion in a direction toward where the electrode terminal is positioned, and includes a branched structure bifurcated in two directions (Continued)

with respect to a direction in which the contact portion extends and protrudes from the main body portion.

20 Claims, 8 Drawing Sheets

(51) Int. Cl.
| | |
|---|---|
| H01M 50/528 | (2021.01) |
| H01M 50/50 | (2021.01) |
| H01M 50/522 | (2021.01) |
| H01M 50/516 | (2021.01) |
| H01M 50/505 | (2021.01) |
| H01M 50/213 | (2021.01) |
| B23K 103/12 | (2006.01) |
| B23K 101/36 | (2006.01) |
| H01M 50/262 | (2021.01) |
| H01M 50/289 | (2021.01) |
| H01M 50/244 | (2021.01) |

(52) U.S. Cl.
CPC ......... *H01M 50/50* (2021.01); *H01M 50/505* (2021.01); *H01M 50/516* (2021.01); *H01M 50/522* (2021.01); *H01M 50/528* (2021.01); *B23K 2101/36* (2018.08); *B23K 2103/12* (2018.08); *H01M 50/244* (2021.01); *H01M 50/262* (2021.01); *H01M 50/289* (2021.01)

(58) Field of Classification Search
CPC .. H01M 50/289; H01M 5/262; H01M 50/213; H01M 50/522; H01M 50/50; B23K 11/14; B23K 35/05; B23K 2103/12; B23K 2101/36
See application file for complete search history.

(56) References Cited

U.S. PATENT DOCUMENTS

| | | | |
|---|---|---|---|
| 2008/0081252 A1 | 4/2008 | Miyazaki | |
| 2010/0099024 A1* | 4/2010 | Kim | H01R 4/029 174/126.1 |
| 2011/0076543 A1 | 3/2011 | Ro | |
| 2011/0281151 A1 | 11/2011 | Lee | |
| 2012/0156561 A1 | 6/2012 | Onose et al. | |
| 2013/0202941 A1 | 8/2013 | Ono et al. | |
| 2013/0230761 A1 | 9/2013 | Okutani et al. | |
| 2014/0072859 A1 | 3/2014 | Won et al. | |
| 2016/0181579 A1* | 6/2016 | Geshi | H01M 50/20 429/61 |
| 2016/0301056 A1 | 10/2016 | Yi | |
| 2017/0062789 A1* | 3/2017 | Sim | H01M 50/502 |

FOREIGN PATENT DOCUMENTS

| | | |
|---|---|---|
| CN | 206134791 U | 4/2017 |
| CN | 104380405 B | 7/2017 |
| CN | 206742367 U | 12/2017 |
| JP | 2001-155712 A | 6/2001 |
| JP | 2008-091182 A | 4/2008 |
| JP | 2014-56808 A | 3/2014 |
| JP | 2015-141800 A | 8/2015 |
| JP | 2017-157509 A | 9/2017 |
| JP | 6229903 B2 | 11/2017 |
| KR | 10-2011-0035474 A | 4/2011 |
| KR | 10-1223731 B1 | 1/2013 |
| KR | 10-2016-0096041 A | 8/2016 |
| KR | 10-2016-0120996 A | 10/2016 |
| WO | 2008/062951 A1 | 5/2008 |
| WO | 2012/073399 A1 | 6/2012 |
| WO | 2012/164832 A1 | 12/2012 |
| WO | 2017/169524 A1 | 10/2017 |

OTHER PUBLICATIONS

Office Action dated Mar. 15, 2021, issued in corresponding Japanese Patent Application No. 2020-516398.
International Search Report issued in corresponding International Patent Application No. PCT/KR2019/000920, dated May 15, 2019.
Extended European Search Report issued in corresponding European Patent Application No. 19788741.7, dated Feb. 2, 2021.

* cited by examiner

BATTERY MODULE HAVING BUS BAR, AND BATTERY PACK

TECHNICAL FIELD

The present disclosure relates to a battery module including a bus bar and a battery pack including the battery module, and more particularly, to a battery module including a bus bar and a battery pack including the battery module, in which weldability between a bus bar and an electrode terminal of a cylindrical battery cell may be increased, heat dissipation efficiency may be increased, and current loss may be reduced.

The present application claims priority to Korean Patent Application No. 10-2018-0046147 filed on Apr. 20, 2018 in the Republic of Korea, the disclosures of which are incorporated herein by reference.

BACKGROUND ART

Recently, demands for portable electronic products, such as laptop computers, video cameras, portable phones, etc. have rapidly increased, and development of electric vehicles, batteries for energy storage, robots, and satellites, etc. has increased, and thus studies on high-performance secondary batteries capable of repetitive charging and discharging are actively conducted.

Currently commercialized secondary batteries include nickel cadmium batteries, nickel hydrogen batteries, nickel zinc batteries, lithium secondary batteries, etc., and thereamong, the lithium secondary batteries are in the limelight because the lithium secondary batteries have almost no memory effect compared to nickel-based secondary batteries and are thus freely charged and discharged, have a very low self-discharge rate, and have high energy density.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate respectively coated with a positive electrode active material and a negative electrode active material are arranged with a separator therebetween, and an exterior material, i.e., a battery case, sealing and accommodating the electrode assembly with an electrolyte solution together.

The lithium secondary battery may be classified, according to a shape of the exterior material, into a can-type secondary battery, in which the electrode assembly is embedded in a metal can, and a pouch-type secondary battery, in which an electrode assembly is embedded in a pouch of an aluminum laminate sheet.

In the can-type secondary battery, a metal can including an electrode assembly may have a cylindrical shape. The can-type secondary battery may be used to configure a battery module including a housing accommodating a plurality of secondary batteries and a bus bar configured to electrically connect the plurality of secondary batteries.

Recently, a bus bar included in such a battery module has been manufactured using a material having a relatively high electrical resistance to increase weldability of resistance welding with respect to an electrode terminal.

However, the bus bar may be a factor that increases current loss in a current generated in a secondary battery and transferred to an external device, thus degrading energy efficiency. Also, the higher the electrical resistance of a material, the lower the thermal conductivity of the material is. Thus, the material may be a factor that degrades heat dissipation performance of a battery module in which the bus bar as described above is applied.

On the other hand, a material having an excessively low electrical resistance may reduce an amount of heat generated according to resistance welding, making the resistance welding difficult. Thus, it may be difficult to select an appropriate material for bus bars.

Moreover, for bus bars applied to low-cost battery modules, a low-priced material has to be applied to lower the manufacturing costs.

Also, in the related art, in order to electrically connect a plurality of battery modules to each other to configure a battery pack, bus bars applied to each of the plurality of battery modules have to be electrically connected to each other. However, a process of electrically connecting a plurality of provided bus bars at the same time when arranging a plurality of battery modules is typically performed by using an additional connection member, and thus the connection and fixing thereof require a complicated and difficult process. Thus, this process has been a significant factor that increases the manufacturing time and the manufacturing costs.

DISCLOSURE

Technical Problem

The present disclosure is designed to solve the problems of the related art, and therefore the present disclosure is directed to providing a battery module including a bus bar and a battery pack including the battery module, in which weldability between a bus bar and an electrode terminal of a cylindrical battery cell may be increased, a heat dissipation efficiency may be increased, and current loss may be reduced.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a plurality of cylindrical battery cells including electrode terminals respectively formed at a top and a bottom of the plurality of cylindrical cells, the plurality of cylindrical battery cells being arranged in columns and rows in a horizontal direction; a module housing including an accommodation portion having a plurality of hollow structures to accommodate the plurality of cylindrical battery cells inserted into the module housing; and a bus bar configured to contact the electrode terminals of the plurality of cylindrical battery cells to electrically connect between the plurality of cylindrical battery cells, wherein the bus bar includes: a main body portion that is positioned at a top or a bottom of the plurality of cylindrical battery cells and has a plate shape having upper and lower surfaces that are broader than a lateral surface of the main body portion in a horizontal direction; and a contact portion that is configured to electrically contact and be connected to an electrode terminal formed in one of the plurality of cylindrical battery cells, extends and protrudes from the main body portion in a horizontal direction, is stepped from the main body portion in a direction toward where the electrode terminal is positioned, and includes a branched structure bifurcated in two directions with respect to a direction in which the contact portion extends and protrudes from the main body portion, wherein an embossed protrusion protruding toward where the electrode terminal is positioned is formed in the branched structure, and a contact area is set to allow a welding rod to establish electrical connection around the embossed protrusion in the branched structure.

Also, at least one connection opening that is perforated vertically may be formed in the main body portion.

Moreover, the contact portion may be formed within a circumference of the connection opening.

Also, a notch may be formed in a connection area between the circumference of the connection opening and the contact portion.

Also, the connection opening may be formed at an end of the main body portion.

Moreover, the bus bar may include a copper alloy.

Also, the embossed protrusion may have an annular shape in a plan view and is formed to have a greater protruding depth toward a center of the annular shape of the embossed protrusion in a direction toward where the electrode terminal is formed.

Also, the welding rod may have a cylindrical shape.

Moreover, a diameter of the annular shape of the embossed protrusion may be less than a diameter of the cylindrical shape of the welding rod.

Also, an insertion groove that is internally engraved in a direction where the electrode terminal is formed may be formed in a peripheral circumference of the embossed protrusion, wherein an end of the cylindrical welding rod in a vertical direction is inserted into the insertion groove.

Moreover, the electrode terminals of the cylindrical battery cells may include a first electrode terminal formed at an upper end of the cylindrical battery cells and a second electrode terminal formed at a lower end of the cylindrical battery cells.

The bus bar may include: a first bus bar mounted to a top of the module housing to be electrically connected to the first electrode terminal; and a second bus bar mounted under the module housing to be electrically connected to the second electrode terminal, The first bus bar may include a mounting portion formed at a front end portion of the main body portion to be in contact with a portion of the second bus bar.

The second bus bar may include: a bent portion that is vertically and upwardly bent and extended from a rear end portion of the main body portion; and a connection portion that is bent and extended backward from an upper end of the bent portion and is configured to be mounted on the mounting portion of the first bus bar to be electrically connected to the first bus bar.

In another aspect of the present disclosure, there is provided a battery module including: a plurality of cylindrical battery cells including electrode terminals respectively formed at a top and a bottom of the plurality of cylindrical cells and a plurality of externally protruding protrusions formed on the electrode terminals, the plurality of cylindrical battery cells being arranged in columns and rows in a horizontal direction; a module housing including an accommodation portion having a plurality of hollow structures to accommodate the plurality of cylindrical battery cells inserted into the module housing; and a bus bar coupled to the protrusions of the electrode terminals of the plurality of cylindrical battery cells by welding and configured to electrically connect between the plurality of cylindrical battery cells, wherein the bus bar includes: a main body portion that is positioned at a top or a bottom of the plurality of cylindrical battery cells and has a plate shape having upper and lower surfaces that are broader than a lateral surface of the main body portion in a horizontal direction; and a contact portion that is configured to electrically contact and be connected to an electrode terminal formed in one of the plurality of battery cells, extends and protrudes from the main body portion in a horizontal direction, is stepped from the main body portion in a direction toward where the electrode terminal is positioned, and includes a branched structure bifurcated in two directions with respect to a direction in which the contact portion extends and protrudes from the main body portion, wherein an embossed protrusion protruding toward where the electrode terminal is positioned is formed in the branched structure, and a contact area is set to allow a welding rod to establish electrical connection around the embossed protrusion in the branched structure.

Also, a battery pack according to the present disclosure may include at least two battery modules described above, which are arranged in a direction.

Moreover, a device according to the present disclosure may include the battery pack described above.

Advantageous Effects

According to an aspect of the present disclosure, according to a battery module of the present disclosure, a coupling protrusion and a guide groove are formed in an outer side wall of a module housing, thereby enabling easy arrangement of a plurality of battery modules and fixing the battery modules so as to prevent them from being easily separated from each other.

Also, according to an aspect of the present disclosure, a first protruded fastening portion formed in a module housing and a second protruded fastening portion of another module housing may be fastened to each other via a bolt, thus fastening the battery modules by ensuring prevention of breaking of the arrangement of the battery modules. In particular, the above fastening structure may prevent disconnection of an electrical connection between a first bus bar and a second bus bar.

Moreover, according to an aspect of the present disclosure, by forming a stepped structure in a contact portion of a bus bar, the contact portion may be arranged adjacent to an electrode terminal, and deformation of or damage to a connection area between the contact portion and a main body portion due to a pressure applied to the contact portion during projection welding may be reduced.

According to an aspect of the present disclosure, a contact portion of a bus bar may be used to set a long current path due to a branched structure during resistance welding, thereby effectively generating resistance heat and thus obtaining a high welding efficiency and high reliability.

Furthermore, according to an aspect of the present disclosure, as the contact area P which is annular is set in the periphery of the embossed protrusion so that the welding rod contact and pressurize the bus bar, a pressing force of the welding rod may be evenly transferred to the embossed protrusion, and a current may be flown from the welding rod to the embossed protrusion at an overall uniform current density. Accordingly, according to the bus bar of the present disclosure, welding between the contact portion and the electrode terminals may be obtained at a higher adhesive force and higher reliability.

Also, according to an aspect of the present disclosure, by forming the insertion groove, into which an end of the welding rod is inserted, in the peripheral circumference of the embossed protrusion, not only the size of the contact area of the welding rod may be increased, but an insertion position of the welding rod may also be guided along an inner surface of the insertion groove, thus facilitating resistance welding. Also, deviation of the welding rod from the contact area, which may occur when the welding rod is pressurized, may be prevented.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
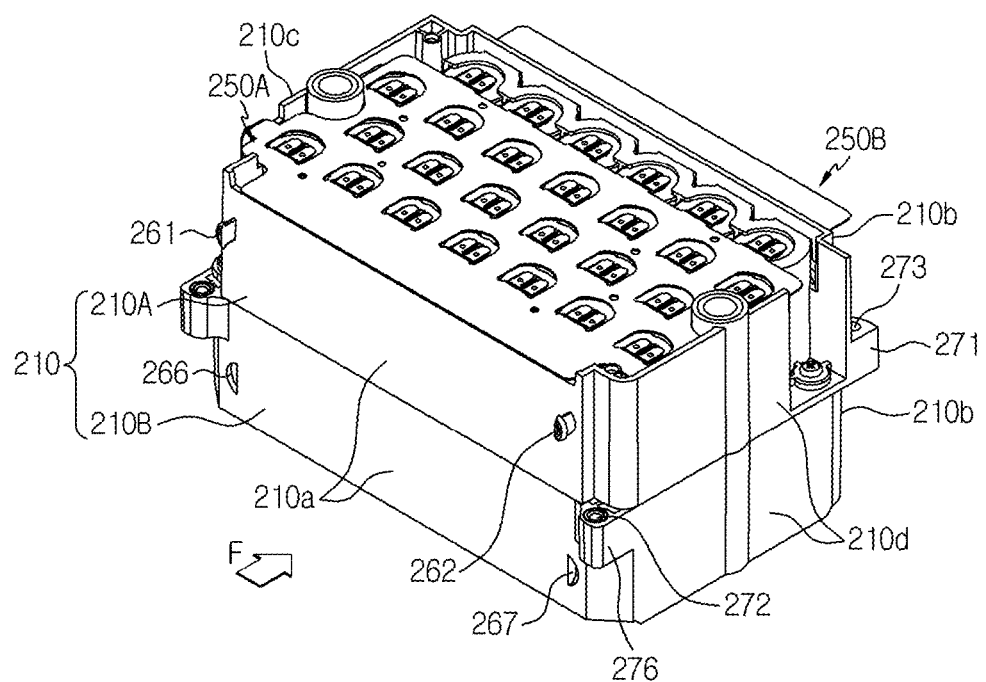
FIG. 1 is a perspective view schematically showing a battery module according to an embodiment of the present disclosure.
Figure 2:
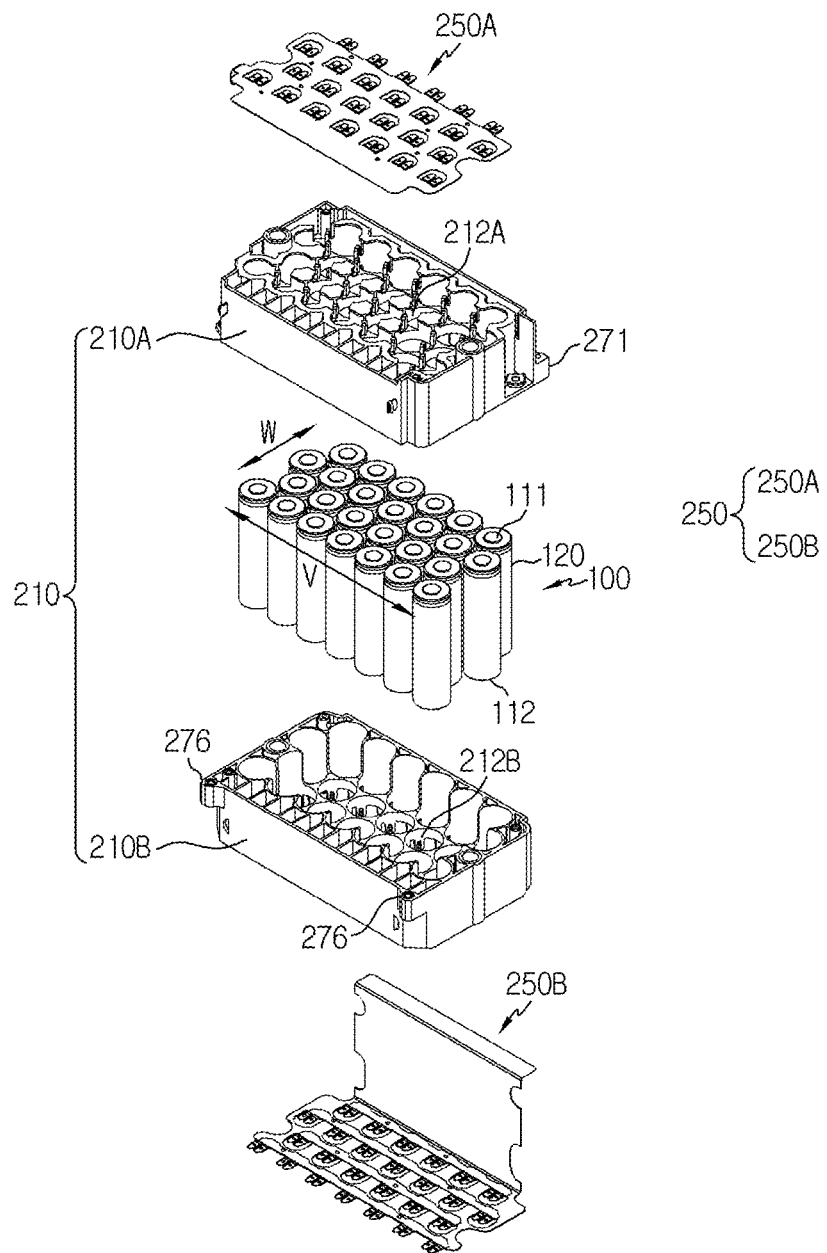
FIG. 2 is a disassembled perspective view schematically showing a battery module according to an embodiment of the present disclosure.

FIG. 1 is a perspective view schematically showing a battery module according to an embodiment of the present disclosure. FIG. 2 is a disassembled perspective view schematically showing a battery module according to an embodiment of the present disclosure.

Referring to FIGS. 1 and 2, a battery module 200 according to an embodiment of the present disclosure may include a cylindrical battery cell 100, a module housing 210, and a bus bar 250.

Here, the cylindrical battery cell 100 may include a cylindrical battery can 120 and an electrode assembly (not shown) accommodated in the battery can 120.

Here, the battery can 120 includes a material having a high electrical conductivity. For example, the battery can 120 may include an aluminum material or copper material.

Also, the battery can 120 may be configured in a vertically extending shape. Also, the battery can 120 may be a vertically extending cylindrical shape. Moreover, electrode terminals 111 and 112 may be respectively formed at upper and lower portions of the battery can 120. In detail, a first electrode terminal 111 may be formed on a flat circular upper surface at an upper end of the battery can 120, and a second electrode terminal 112 may be formed on a flat circular lower surface at a lower end of the battery can 120.

Furthermore, the cylindrical battery cell 100 may be arranged in a plurality of columns and rows in a horizontal direction. The horizontal direction may refer to a direction parallel to a ground surface on which the cylindrical battery cell 100 is placed, and may also refer to at least one direction on a plane perpendicular to a vertical direction.

For example, as illustrated in FIG. 2, the battery module 200 may include a plurality of cylindrical battery cells 100 arranged in four rows in a back and forth direction W and in seven or six rows in a left and right direction V.

Also, the electrode assembly (not shown) may have a structure in which a positive electrode and a negative electrode are wound in a jelly-roll form with a separation layer interposed between the positive and negative electrodes. A positive electrode tab may be attached to the positive electrode (not shown) to be connected to the first electrode terminal 111 at the upper end of the battery can 120. A negative electrode tab may be attached to the negative electrode (not shown) to be connected to the second electrode terminal 112 at the lower end of the battery can 120.

Meanwhile, the module housing 210 may include accommodation portions 212A and 212B into which the cylindrical battery cell 100 may be inserted to be accommodated therein. In detail, a plurality of hollow structures formed to surround an outer side surface of the cylindrical battery cell 100 may be formed in the accommodation portions 212A and 212B.

Also, the module housing 210 may include a first outer side wall 210a, a second outer side wall 210b, a third outer side wall 210c, and a fourth outer side wall 210d that are formed to form an internal space of the module housing 210 and respectively in a front direction, a back direction, a left direction, and a right direction.

Also, coupling protrusions 261 and 262 and guide grooves 266 and 267 that are used to guide an arrangement position of another battery module 200 may be formed in at least one of the first outer side wall 210a, the second outer side wall 210b, the third outer side wall 210c, and the fourth outer side wall 210d of the module housing 210.

For example, as illustrated in FIG. 1, two coupling protrusions 261 and 262 and two guide grooves 266 and 267 may be respectively formed in the first outer side wall 210a and the second outer side wall 210b of the module housing 210.

Thus, according to this configuration of the present disclosure, the coupling protrusions 261 and 262 of the module housing 210 according to the present disclosure may be inserted into the guide grooves 266 and 267 formed in the second outer side wall 210b of another module housing 210 to be fastened and fixed thereto, and thus, another battery module 201 (FIG. 12) connected to one battery module 200 may be easily arranged, and the battery modules may be fixed so that they are not easily separated.

Referring back to FIGS. 1 and 2, an upper case 210A may include a first protruded fastening portion 271, and a lower case 210B may include a second protruded fastening portion 276.

In detail, the first protruded fastening portion 271 may protrude and extend backward from an outer surface of the second outer side wall 210b of the first upper case 210A when viewed in an F direction. Also, the second protruded fastening portion 276 may protrude and extend forward from an outer surface of the first outer side wall 210a of the lower case 210B when viewed in the F direction.

The terms indicating directions, such as front, back, left, right, up, and down may vary depending on a position of an observer or a manner in which an object is placed. However, for convenience of description, directions, such as front, back, left, right, up, and down, viewed in the F-direction are described in the present specification.

Figure 12:
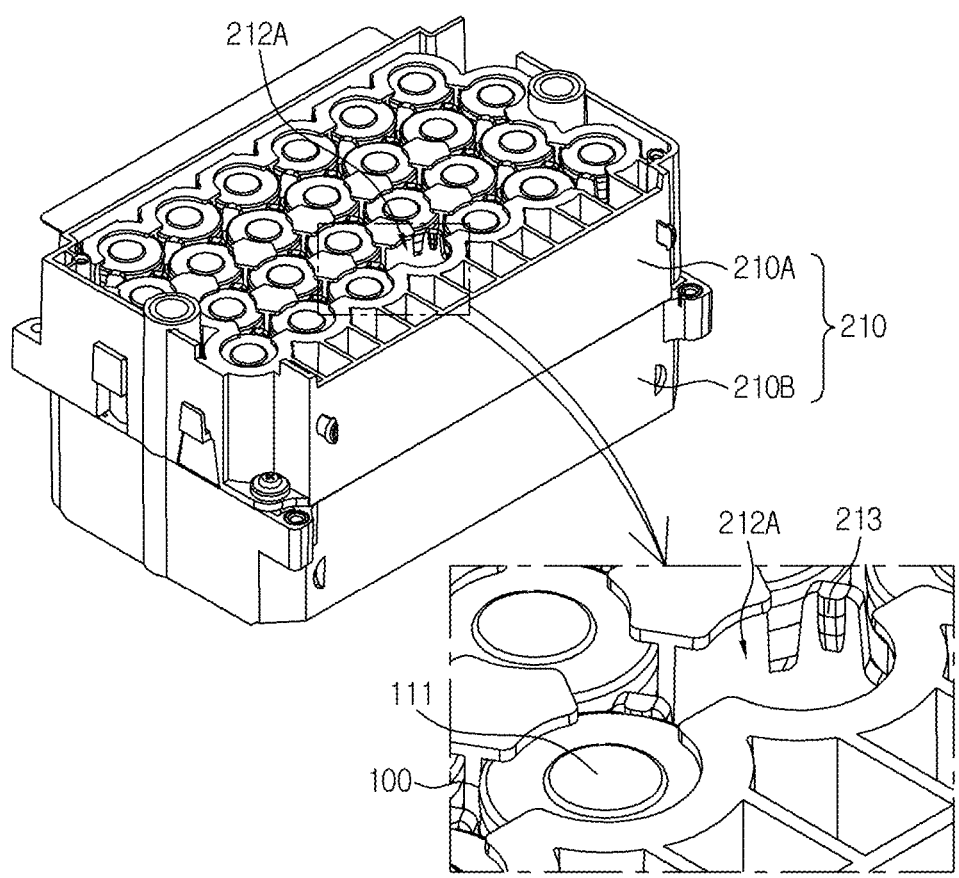
FIG. 12 is a perspective view schematically showing some components of a battery module, according to an embodiment of the present disclosure.
Figure 13:
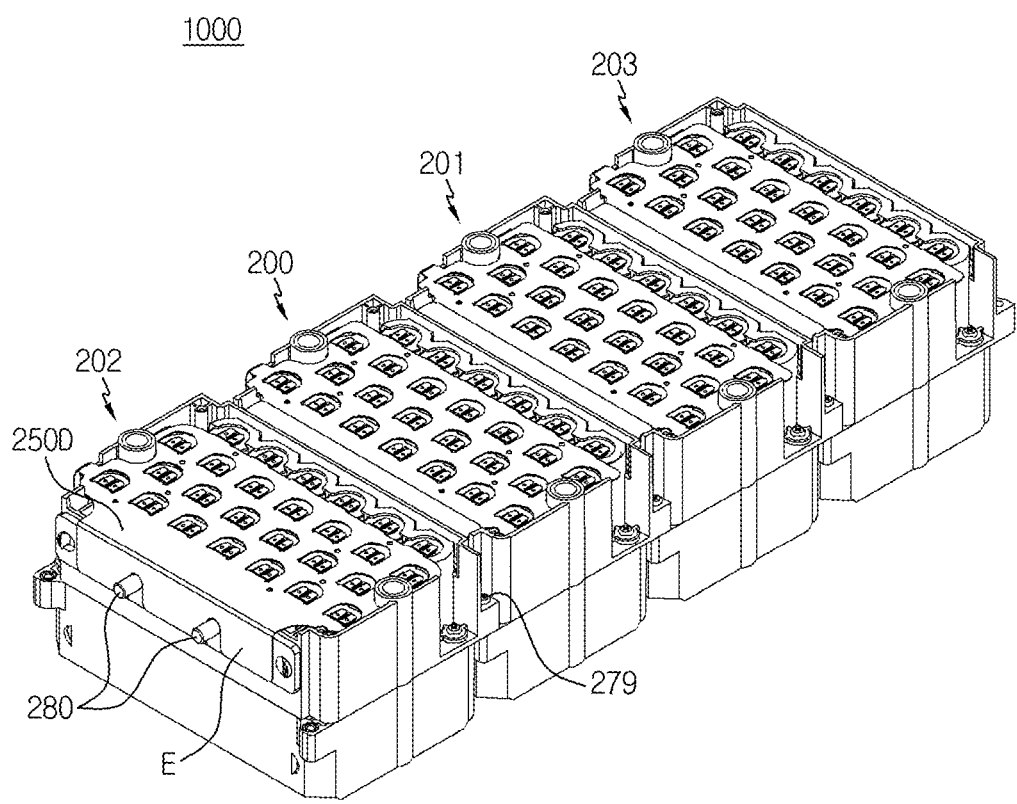
FIG. 13 is a perspective view schematically illustrating a battery pack according to an embodiment of the present disclosure.

Also, through holes 272, 273 may be respectively formed in the first protruded fastening portion 271 and the second protruded fastening portion 276 so as to insert a fastening bolt 279 (FIG. 13). For example, as illustrated in FIG. 1, the first protruded fastening portion 271 of the module housing 210 may be fastened and coupled to the second protruded fastening portion 276 of another battery module 201 (FIG. 12) through the fastening bolt 279.

Here, the through hole 272 of the second protruded fastening portion 276 may be communicatively connected to the through hole 273 of the first protruded fastening portion 271 of the upper case 210A of another battery module 200 such that the fastening bolt 279 is continuously inserted into the through holes 273 and 272. Accordingly, in the one battery module 200 and the other battery module (201 of FIG. 13), the battery modules (200, 201, 202, 203 of FIG. 13) may be arranged as the first protruded fastening portion 271 and the second protruded fastening portion 276 are fastened to each other by using the fastening bolt 279.

Accordingly, according to this configuration of the present disclosure, as the first protruded fastening portion 271 of the upper case 210A is fastened to the second protruded fastening portion 276 of the lower case 210B of another battery module 200 via a bolt, breaking of the arrangement of the battery modules 200 may be prevented, and particularly, disconnection of electrical connection between the first bus bar 250A and the second bus bar 250B may be prevented.

Meanwhile, the module housing 210 may include the upper case 210A and the lower case 210B.

Figure 3:
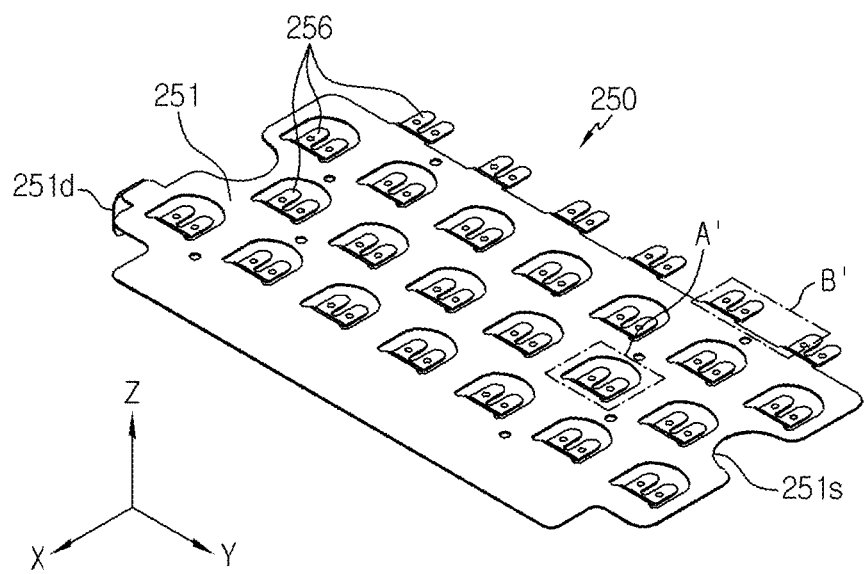
FIG. 3 is a perspective view schematically showing some components of a battery module, according to an embodiment of the present disclosure.

FIG. 3 is a perspective view schematically showing some components of a battery module, according to an embodiment of the present disclosure.

Referring to FIG. 3 with FIG. 2, the bus bar 250 may include a structure in which a surface of the bus bar 250 contacts the electrode terminals 111 and 112 of at least two cylindrical battery cells 100 from among the plurality of cylindrical battery cells 100 to be electrically connected to the cylindrical battery cells 100. That is, the bus bar 250 may be configured to contact the first electrode terminal 111 or the second electrode terminal 112 of the plurality of cylindrical battery cells 100 to electrically connect between the plurality of cylindrical battery cells 100. In detail, the bus bar 250 may include a main body portion 251 and a contact portion 256.

Here, the main body portion 251 may have a plate shape having upper and lower surfaces that are broader than a lateral surface thereof in a horizontal direction (x-direction, y-direction). Also, the main body portion 251 may be positioned at a top or a bottom of the plurality of cylindrical battery cells 100 where the first electrode terminal 111 or the second electrode terminal 112 is formed.

Also, a hanging structure 251d for fixing a position of the bus bar 250 may be formed at an end portion of the main body portion 251 in a horizontal direction (y-direction). Moreover, a through port (not shown) may be formed in the hanging structure 251d such that the hanging structure 251d is coupled to an outer wall of the module housing 210 via a bolt.

Also, a curved portion 251s that is inwardly curved to correspond to an outer shape of the module housing 210 may be formed in the main body portion 251.

Figure 4:
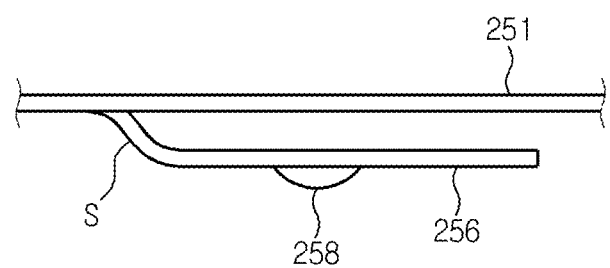
FIG. 4 is a partial side view schematically showing a region A' of a bus bar of FIG. 3.
Figure 5:
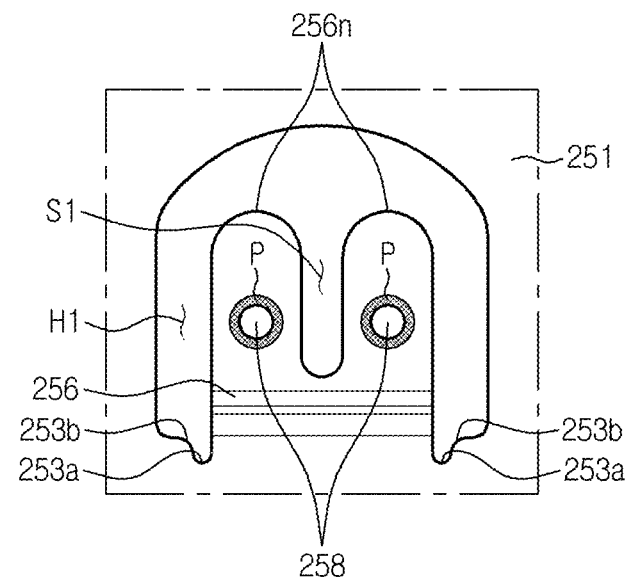
FIG. 5 is a partial plan view schematically showing the region A' of the bus bar of FIG. 3.

FIG. 4 is a partial side view schematically showing a region A' of a bus bar of FIG. 3. FIG. 5 is a partial plan view schematically showing the region A' of the bus bar of FIG. 3.

Referring to FIGS. 4 and 5 with FIG. 2, the contact portion 256 may be configured to electrically contact and be connected to the first electrode terminal 111 or the second electrode terminal 112 formed in one of the plurality of cylindrical battery cells 100. To this end, the contact portion 256 may extend and protrude from the main body portion 251 in a horizontal direction (x-direction). For example, as illustrated in FIG. 3, the contact portion 256 may extend and protrude backward from the main body portion 251.

Also, in the contact portion 256, a stepped structure S that is stepped from the main body portion 251 in a direction (downward direction) toward where the first electrode terminal 111 or the second electrode terminal 112 is positioned may be formed. For example, as illustrated in FIG. 3, in the contact portion 256, a stepped structure S that is stepped in a direction (downward direction) to where the first electrode terminal 111 formed in an upper portion of the cylindrical battery cell 100 is positioned may be formed.

Thus, according to this configuration of the present disclosure, as the stepped structure S is formed in the contact portion 256, the contact portion 256 may be arranged adjacent to the electrode terminals 111 and 112, and deformation of or damage to a connection area between the contact portion 256 and the main body portion 251 due to a pressure applied to the contact portion 256 during projection welding may be reduced.

Also, in the contact portion 256, a branched structure 256n that is bifurcated in two directions with respect to a direction in which the contact portion 256 extends and protrudes from the main body portion 251 may be included. That is, in the contact portion 256, a groove or a slit 51 that are inwardly curved in an opposite direction to ends (of the branched structure 256n in the extended and protruded direction.

For example, as illustrated in FIG. 3, twenty-six contact portions 256 may be formed in the bus bar 250. Also, a branched structure 256n bifurcated in left and right directions may be formed in each of the twenty-six contact portions 256.

Moreover, an embossed protrusion 258 protruding toward where the electrode terminals 111 and 112 are positioned may be formed in the branched structure 256n. That is, an embossed protrusion 258 may be formed in each of two portions branched off from the branched structure 256n.

Furthermore, the branched structure 256n may be configured such that a welding rod 300 is contacted by and connected to the branched structure 256n. In detail, a contact area P may be set such that the welding rod 300 (FIG. 7) having a cylindrical shape establishes electrical connection around the embossed protrusion 258 formed in the branched structure 256n.

Referring back to FIGS. 3 and 5, at least one connection opening H1 perforated vertically may be formed in the main body portion 251. Also, the contact portion 256 may protrude and extend backward within a circumference of the connection opening H1. That is, the connection opening H1 may be formed to surround the protruding and extending portion of the contact portion 256.

Moreover, a notch 253a and a convex structure 253b may be formed in the connection opening H1. Here, the notch 253a and the convex structure 253b may be formed such that a stepped structure is formed in the contact portion 256 and thus to prevent damage or deformation that may occur while pressing the contact portion 256 from above in a downward direction. That is, the notch 253a may have a circumference that is inwardly curved in a round shape. In other words, the notch 253a may have a curved shape to distribute a stress caused by pressing the contact portion 256. Furthermore, the convex structure 253b may be convexly protruded to absorb a stress generated during formation of a stepped structure S.

Also, the connection opening H1 may be formed to space the branched structure 256n of the contact portion 256 apart from the main body portion 251 so that they do not contact each other. That is, the branched structure 256n may induce a current that is added via the welding rod 300 such that the current is not distributed to the main body portion 251 but is completely energized through the branched structure 256n.

Figure 6:
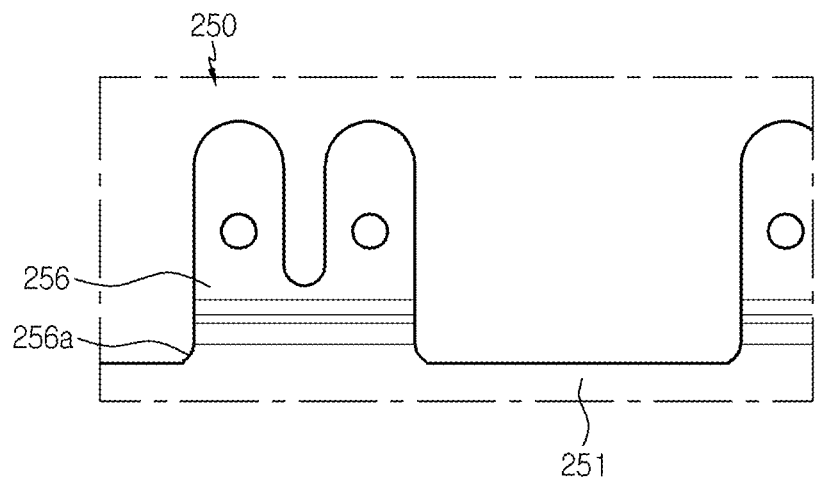
FIG. 6 is a partial plan view schematically showing a region B' of the bus bar of FIG. 3.

FIG. 6 is a partial plan view schematically showing a region B' of the bus bar of FIG. 3. The contact portion 256 of FIG. 6 may have a similar or identical component or structure as the contact portion 256 of FIG. 5 described above, and thus detailed description thereof will be omitted.

Referring to FIG. 6 with FIG. 3, the contact portion 256 may be formed at an end of the main body portion 251. That is, unlike the contact portion 256 of FIG. 5, the contact portion 256 is not formed within the connection opening H1 formed in the main body portion 251. For example, as illustrated in FIG. 3, six contact portions 256 that are not formed within the connection opening H1 may be formed at a rear end of the bus bar 250.

Accordingly, according to this configuration of the present disclosure, the contact portions 256 that are not formed within the connection opening H1 of FIG. 6 do not form additional connection openings H1, and thus may be formed by simple shape processing, and degradation of mechanical characteristics of the bus bar 250 due to shape processing may be reduced, and efficient resistance welding may be performed.

Also, the main body portion 251 of the bus bar 250 may have a shape that does not cover all of the plurality of cylindrical battery cells 100. For example, as illustrated in FIG. 1, the main body portion 251 of the bus bar 250 may not cover all of the plurality of cylindrical battery cells 100, but may be formed such that upper ends of the cylindrical battery cells 100 at a rearmost column from among the plurality of cylindrical battery cells 100 are exposed to the outside.

Thus, according to this configuration of the present disclosure, by forming the main body portion 251 such that upper ends of some of the cylindrical battery cells 100 are externally exposed, the material cost of the bus bar 250 may be reduced, and heat generated by charging and discharging the plurality of cylindrical battery cells 100 accommodated in the module housing 210 may be effectively discharged to the outside.

The bus bar 250 may include a copper alloy. In detail, the copper alloy may include at least 60 wt % of copper in the total weight, and more specifically, the copper alloy may include at least 90 wt % of copper in the total weight. The copper alloy may include at least one selected from the group consisting of nickel, silicon, tin, iron, zinc, magnesium, phosphorus, chromium, and zirconium in the remaining weight percent excluding the weight percentage of copper. For example, the copper alloy may include at least 90 wt % copper, less than 10 wt % zinc, less than 10 wt % chromium, and less than 5 wt % zirconium. Further, in another embodiment, the copper alloy may include at least 90 wt % copper, less than 5 wt % nickel, less than 1 wt % silicon, less than 1 wt % tin, at least 1 wt % iron, at least 1 wt % zinc, at least 0.1 wt % magnesium, at least 0.1 wt % phosphorus, and at least 0.1 wt % zirconium. However, the bus bar 250 is not limited to a copper alloy, but any metal alloy consisting of nickel, aluminum, gold, silver, or the like as a main material may be used.

Therefore, when the bus bar 250 including a copper alloy is used, the battery module 200 according to the present disclosure has a higher conductivity than a bus bar formed of a nickel material, thereby minimizing current loss and effectively generating heat. Accordingly, heat dissipation of the battery module may be facilitated to increase a cooling efficiency of the battery module.

Also, a plating layer may be formed using a metal having a relatively high specific resistance compared to the bus bar 250, on a surface of the bus bar 250. For example, the metal having a high specific resistance may be nickel. Moreover, the plating layer may have a thickness of 1 μm to 3 μm. In detail, when the thickness of the plating layer is less than 1 μm, it is difficult to generate a relatively high resistance by using the plating layer in a welding portion during resistance welding, and thus, it is difficult to perform efficient resistance welding. On the other hand, when the thickness of the plating layer exceeds 3 μm, welding processability between the contact portion 256 and the electrode terminals 111 and 112 may be degraded, which is undesirable.

Figure 7:
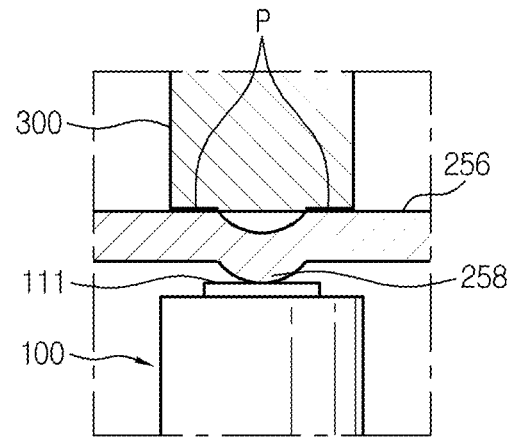
FIG. 7 is a partial side view schematically illustrating a process of welding a contact portion of a bus bar and an electrode terminal of a battery module, according to an embodiment of the present disclosure.

FIG. 7 is a partial side view schematically illustrating a process of welding a contact portion of a bus bar and an electrode terminal of a battery module, according to an embodiment of the present disclosure.

Referring to FIG. 7 with FIG. 5, the embossed protrusion 258 formed on the branched structure 256n may be annular in a plan view. Also, the embossed protrusion 258 may be formed to have a greater protruding depth toward a center of the annular shape of the embossed protrusion 258 in a direction toward where the electrode terminals 111 and 112 are formed.

Moreover, the welding rod 300 used to perform welding between the contact portion 256 and the electrode terminals 111 and 112 may be configured to pressurize the entire contact area P which is configured to establish electrical connection of the welding rod 300. For example, when the contact area P is formed along a periphery of an upper portion of the annular embossed protrusion 258, a lower surface of the welding rod 300 contacting the contact area P may have a circular shape. Moreover, the welding rod 300 may have a cylindrical shape having a lower surface that is a flat circle. Here, an outermost diameter of the annular shape of the embossed protrusion 258 may be smaller than a diameter of the cylindrical shape of the welding rod 300.

Thus, according to this configuration of the present disclosure, as the contact area P which is annular is set in the bus bar 250 in the periphery of an upper surface of the annular embossed protrusion 258 so that the cylindrical welding rod 300 may contact and pressurize the bus bar 250, a pressing force of the welding rod 300 may be evenly transferred to the embossed protrusion 258, and a current may be flown from the welding rod 300 to the embossed protrusion 258 at an overall uniform current density. Accordingly, according to the bus bar 250 of the present disclosure, welding between the contact portion 256 and the electrode terminals 111 and 112 may be obtained at a higher adhesive force and higher reliability.

Figure 8:
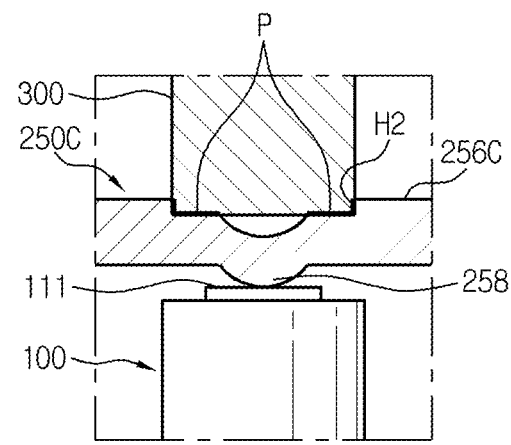
FIG. 8 is a partial side view schematically illustrating a process of welding a contact portion of a bus bar and an electrode terminal of a battery module, according to another embodiment of the present disclosure.

FIG. 8 is a partial side view schematically illustrating a process of welding a contact portion 256C of a bus bar 250C and a first electrode terminal 111 of a battery module, according to another embodiment of the present disclosure. The contact portion 256C of FIG. 8 may have a similar or identical component or structure as the contact portion 256 of FIG. 7 described above, and thus detailed description thereof will be omitted.

Referring to FIG. 8, in the bus bar 250C according to the other embodiment, an insertion groove H2 that is internally engraved in a direction to where the electrode terminals 111 and 112 are formed may be formed in a peripheral circumference of an upper portion of the embossed protrusion 258 formed in the contact portion 256C. Also, the insertion groove H2 may have a size that allows a vertical end of the cylindrical welding rod 300 to be inserted thereinto.

For example, as illustrated in FIG. 8, when a surface of a lower end of the welding rod 300 has a flat cylindrical shape, the insertion groove H2 may have a circular shape in a plane view. Also, the insertion groove H2 may be formed to have a certain depth in a direction toward where the electrode terminals 111 and 112 are formed. Furthermore, an inner surface of the insertion groove H2 may be set as a contact area P of the welding rod 300.

Accordingly, according to this configuration of the present disclosure, by forming the insertion groove H2, into which an end of the welding rod 300 is inserted, in the peripheral circumference of the upper portion of the embossed protrusion 258, not only the size of the contact area P of the welding rod 300 may be increased, but a position of the welding rod 300 may also be guided along an inner surface of the insertion groove H2, thus facilitating resistance welding. Also, deviation of the welding rod 300 from the contact area P, which may occur when the welding rod 300 is pressurized, may be prevented.

Figure 9:
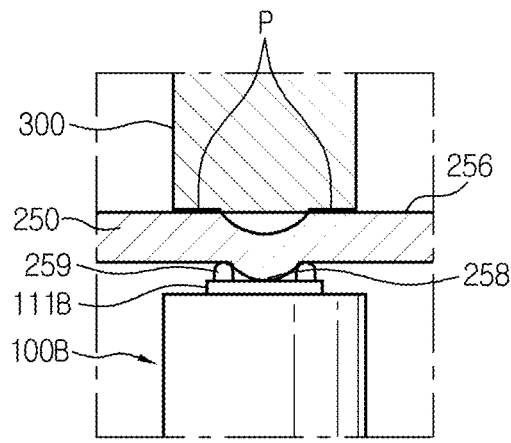
FIG. 9 is a partial side view schematically illustrating a process of welding a contact portion of a bus bar and an electrode terminal of a battery module, according to another embodiment of the present disclosure.

FIG. 9 is a partial side view schematically illustrating a process of welding a contact portion 256 of a bus bar 250 and an electrode terminal 111B of a battery module, according to another embodiment of the present disclosure. A cylindrical battery cell 100B of FIG. 9 may have a similar or identical component or structure as the cylindrical battery cell 100 of FIG. 8 described above, except that a plurality of protrusions 259 are further formed on the electrode terminal 111B, and thus detailed description thereof will be omitted.

Referring to FIG. 9, in the cylindrical battery cell 100B applied to a battery module, according to the other embodiment of the present disclosure, the plurality of protrusions 259 protruding externally may be formed on the electrode terminal 111B formed at a top or a bottom of cylindrical battery cell 100B.

Also, the battery module may include a bus bar 250 that is coupled to the protrusions 259 of the electrode terminal 111B of the plurality of cylindrical battery cells 100B by welding. The bus bar 250 may be configured to electrically connect between the plurality of cylindrical battery cells 100B.

For example, as illustrated in FIG. 9, two protrusions 259 may be formed on the electrode terminal 111B formed on the cylindrical battery cell 100B. The two protrusions 259 may be coupled to a lower surface of the contact portion 256 of the bus bar 250 by projection welding.

Accordingly, according to this configuration of the present disclosure, when coupling the electrode terminal 111B and the bus bar 250 by welding, a welding defect rate may be reduced by using the protrusions 259 formed on the electrode terminal 111B and the embossed protrusion 258 of the bus bar 250, and a welding strength may be further increased.

Figure 10:
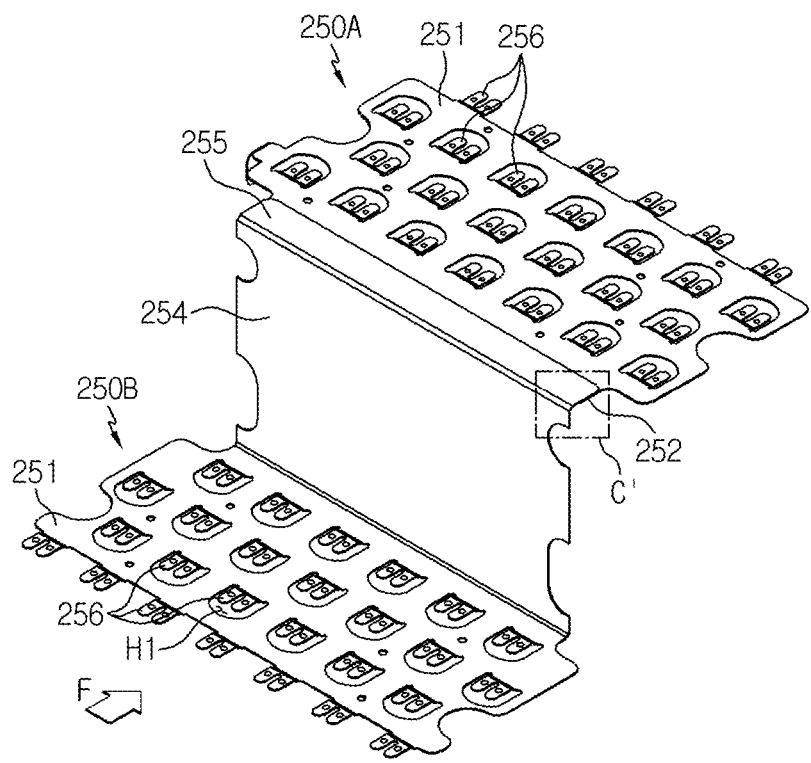
FIG. 10 is a perspective view schematically illustrating a first bus bar and a second bus bar regarding a battery module according to an embodiment of the present disclosure.
Figure 11:
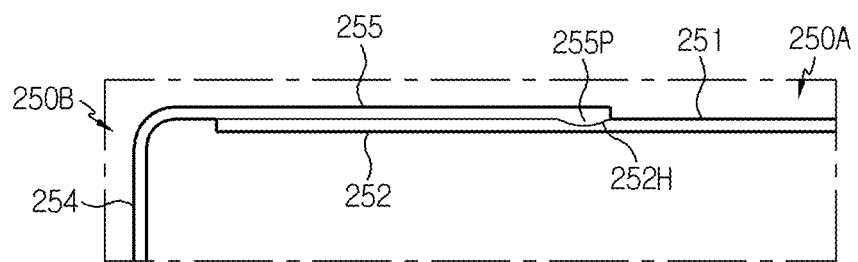
FIG. 11 is a partial side view schematically showing a region C' of FIG. 10.

FIG. 10 is a perspective view schematically illustrating a first bus bar and a second bus bar regarding a battery module according to an embodiment of the present disclosure. FIG. 11 is a partial side view schematically showing a region C' of the battery module of FIG. 10.

First, referring to FIG. 10, the bus bar 250 of the battery module 200 according to an embodiment of the present disclosure may include, specifically, a first bus bar 250A and a second bus bar 250B. Also, the first bus bar 250A and the second bus bar 250B may include both the main body portion 251, the connection opening H1, and the contact portion 256 described above.

Referring to FIGS. 10 and 11 with FIG. 2 again, the bus bar 250 may include the first bus bar 250A that is electrically connected to the first electrode terminal 111 formed at the upper end of the cylindrical battery cell 100 and the second bus bar 250B that is electrically connected to the second electrode terminal 112 formed at the lower end of the cylindrical battery cell 100.

Furthermore, the first bus bar 250A may be mounted to a top of the module housing 210 to contact the first electrode terminal 111. The second bus bar 250B may be mounted under the module housing 210 to contact the second electrode terminal 112.

Furthermore, the first bus bar 250A may include a mounting portion 252 that is formed at a front end portion of the main body portion 251 to be in contact with a portion of the second bus bar 250B when viewed in an F-direction. That is, the mounting portion 252 may have an upper surface to contact a lower surface of a portion of the second bus bar 250B.

Also, the second bus bar 250B may include a bent portion 254 and a connection portion 255 connected to the bent portion 254. In detail, the bent portion 254 may have a structure that is vertically and upwardly bent from a rear end portion of the main body portion 251 of the second bus bar 250B to be extended. Moreover, the connection portion 255 may be bent and extended backward from an upper end of the bent portion 254. Also, the connection portion 255 may be configured to be mounted on the upper surface of the mounting portion 252 of the first bus bar 250A to be electrically connected to the first bus bar 250A. Also, a lower surface of the connection portion 255 may be configured to contact the upper surface of the mounting portion 252 of the first bus bar 250A.

Furthermore, at least one fixing protrusion 255P protruding downwards may be formed on the lower surface of the connection portion 255. Also, an accommodation groove 252H having a shape corresponding to the fixing protrusion 255P of the connection portion 255 may be formed in the mounting portion 252 of the first bus bar 250A. Accordingly, the fixing protrusion 255P of the connection portion 255 of the second bus bar 250B may be inserted into the accommodation groove 252H of the mounting portion 252 of the first bus bar 250A to be fixed.

Thus, according to this configuration of the present disclosure, as the fixing protrusion 255P of the connection portion 255 and the accommodation groove 252H of the mounting portion 252 are coupled to each other, the connection portion 255 may be easily mounted on the mounting portion 252, and furthermore, a contact area may be effectively increased to reduce an electrical resistance and increase electrical connection reliability.

FIG. 12 is a perspective view schematically showing some components of a battery module, according to an embodiment of the present disclosure. Here, to look into an internal structure of the upper case 210A, one of the plurality of cylindrical battery cells 100 is excluded in the drawing.

Referring to FIG. 12 with FIG. 1, a fixing structure for pressing against and fixing a lateral surface of the cylindrical battery cells 100 may be formed in an inner surface of the first accommodation portion 212A of the module housing 210, the inner surface facing the lateral surface of the cylindrical battery cell 100.

For example, the fixing structure may be a convex portion 213 protruding from the inner surface of the first accommodation portion 212A in a horizontal direction where the cylindrical battery cell 100 is positioned (inward direction), to press an outer side surface of the cylindrical battery cell 100.

Accordingly, according to this configuration of the present disclosure, the convex portion 213 may effectively prevent an electrical short circuit between the cylindrical battery cells 100 and the bus bar 250 due to vibration or flow due to an external impact applied to the battery module 200, and also, damage to the cylindrical battery cells 100 due to vibration may be reduced effectively.

FIG. 13 is a perspective view schematically illustrating a battery pack according to an embodiment of the present disclosure.

Referring to FIG. 13 with FIG. 2, a battery pack 1000 according to the present disclosure may include at least two battery modules 200. In detail, the at least two battery modules 200, 201, 202, and 203 may be arranged and aligned in a direction. For example, as illustrated in FIG. 13, four battery modules 200, 201, 202, and 203 may be arranged and aligned in the back and forth direction, and the four battery modules 200, 201, 202, and 203 may be serially and electrically connected to each other via the first bus bar 250A and the second bus bar 250B.

Also, the battery module 202 may include an external input/output terminal 280 electrically connected to a third bus bar 250D. Moreover, unlike the first bus bar 250A illustrated in FIG. 10, the third bus bar 250D of the battery module 202 may include a downwardly bent portion E that is bent downwards such that the third bus bar 250D is electrically contacted by and connected to the external input/output terminal 280.

Accordingly, according to this configuration of the present disclosure, the third bus bar 250D including the downwardly bent portion E may establish electrical connection with respect to the external input/output terminal 280 by using a simple structure, and thus, the time for an assembly process may be reduced.

Referring back to FIG. 13, the battery pack 1000 according to the present disclosure may further include, in addition to the battery module 200, various devices for controlling charging and discharging of the battery module 200, such as a battery management system (BMS), a current sensor, a fuse, etc.

Also, the battery pack 1000 according to the present disclosure may be applied to an energy storage device or a vehicle such as an electric vehicle or a hybrid vehicle. In other words, the vehicle according to the present disclosure may include the battery pack 1000.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

LIST OF REFERENCE NUMERALS

| | |
|---|---|
| 1000: battery pack | 250: bus bar |
| 200, 201, 202, 203: battery module | 251: main body portion |
| 100: cylindrical battery cell | 256: contact portion |
| 111, 112: electrode terminal | 256n: branched structure |
| 210: module housing | 258: embossed protrusion |
| 210A: upper case | H1: connection opening |
| 210B: lower case | 253a: notch |
| 250A: first bus bar | H2: insertion groove |
| 250B: second bus bar | 252: mounting portion |
| 254: bent portion | 255: connection portion |
| 300: welding rod | |

INDUSTRIAL APPLICABILITY

The present disclosure is directed to a battery module and a battery pack including the battery module. Also, the present disclosure is applicable in industries related to an electronic device or a vehicle including the battery pack.

What is claimed is:
1. A battery module, comprising:
a plurality of cylindrical battery cells including electrode terminals each at one of a top and a bottom of a respective one of the plurality of cylindrical cells, the plurality of cylindrical battery cells being arranged in columns and rows in a horizontal direction;
a module housing including an accommodation portion having a plurality of hollow structures to accommodate the plurality of cylindrical battery cells inserted into the module housing; and a bus bar configured to contact the electrode terminals of the plurality of cylindrical battery cells to electrically connect between the plurality of cylindrical battery cells,
wherein the bus bar comprises:
a main body portion at a top or a bottom of the plurality of cylindrical battery cells and defining a plate shape having upper and lower surfaces that are broader than a lateral surface of the main body portion in the horizontal direction; and
a contact portion configured to electrically contact and be connected to one electrode terminal of the electrode terminals of one of the plurality of cylindrical battery cells, that extends and protrudes from the main body portion in a horizontal direction, that is stepped from the main body portion in a direction toward the one electrode terminal, and that includes a branched structure bifurcated in two directions with respect to a direction in which the contact portion extends and protrudes from the main body portion,
wherein the branched structure includes an embossed protrusion such that a first surface of the branched structure is recessed, and a second surface of the branch structure has a protruding surface to protrude toward the one electrode terminal with the first and second surface being on opposite surfaces of the branched structure.

2. The battery module of claim 1, wherein the main body portion includes at least one connection opening, and
wherein the contact portion is within a circumference of the connection opening.

3. The battery module of claim 2, wherein a notch is defined in a connection area between the circumference of the connection opening and the contact portion.

4. The battery module of claim 1, wherein the connection opening is defined at an end of the main body portion.

5. The battery module of claim 1, wherein the bus bar comprises a copper alloy.

6. The battery module of claim 1, wherein the embossed protrusion has an annular shape in a plan view and has a greater protruding depth toward a center of the annular shape of the embossed protrusion in a direction toward the one electrode terminal.

7. The battery module of claim 6, wherein the welding rod has a cylindrical shape, and
a diameter of the annular shape of the embossed protrusion is less than a diameter of the cylindrical shape of the welding rod.

8. The battery module of claim 7, wherein a top surface of the contact portion at a peripheral circumference corresponding to the embossed protrusion includes an insertion groove that is internally engraved, wherein an end of the cylindrical welding rod in a vertical direction is inserted into the insertion groove.

9. The battery module of claim 1, wherein the electrode terminals of the cylindrical battery cells comprise first electrode terminals at an upper end of the cylindrical battery cells and second electrode terminals at a lower end of the cylindrical battery cells,
wherein the bus bar comprises:
a first bus bar mounted to a top of the module housing to be electrically connected to the first electrode terminals; and
a second bus bar mounted to a bottom of the module housing to be electrically connected to the second electrode terminals.

10. A battery module, comprising:
a plurality of cylindrical battery cells including electrode terminals each at one of a top and a bottom of a respective one of the plurality of cylindrical cells and a plurality of externally protruding protrusions formed on the electrode terminals, the plurality of cylindrical battery cells being arranged in columns and rows in a horizontal direction;
a module housing including an accommodation portion having a plurality of hollow structures to accommodate the plurality of cylindrical battery cells inserted into the module housing; and
a bus bar welded to the protrusions of the electrode terminals of the plurality of cylindrical battery cells by welding and configured to electrically connect between the plurality of cylindrical battery cells,
wherein the bus bar comprises:
a main body portion at a top or a bottom of the plurality of cylindrical battery cells and defining a plate shape having upper and lower surfaces that are broader than a lateral surface of the main body portion in the horizontal direction; and
a contact portion configured to electrically contact and be connected to one electrode terminal of one of the plurality of battery cells, that extends and protrudes from the main body portion in a horizontal direction, that is stepped from the main body portion in a direction toward the one electrode terminal, and that includes a branched structure bifurcated in two directions with respect to a direction in which the contact portion extends and protrudes from the main body portion,
wherein the branched structure includes an embossed protrusion such that a first surface of the branched structure is recessed, and a second surface of the branch structure has a protruding surface to protrude toward the one electrode terminal with the first and second surface being on opposite surfaces of the branched structure, and
wherein a contact area is configured to allow a welding rod to establish electrical connection around the embossed protrusion in the branched structure.

11. A battery pack comprising at least two battery modules according to claim 1, which are arranged in a direction.

12. The battery module of claim 10, wherein the main body portion includes at least one connection opening, and
wherein the contact portion is within a circumference of the connection opening.

13. The battery module of claim 12, wherein a notch is defined in a connection area between the circumference of the connection opening and the contact portion.

14. The battery module of claim 10, wherein the embossed protrusion has an annular shape in a plan view and has a greater protruding depth toward a center of the annular shape of the embossed protrusion in a direction toward the one electrode terminal.

15. The battery module of claim 10, wherein the electrode terminals of the cylindrical battery cells comprise first electrode terminals at upper ends of the cylindrical battery cells and second electrode terminals at lower ends of the cylindrical battery cells,
wherein the bus bar comprises:
a first bus bar mounted to a top of the module housing to be electrically connected to the first electrode terminals; and a second bus bar mounted to a bottom of the module housing to be electrically connected to the second electrode terminals, wherein the first bus bar comprises a mounting portion at a front end portion of the main body portion to be in contact with a portion of the second bus bar, and wherein the second bus bar comprises:
- a bent portion that is vertically and upwardly bent and extended from a rear end portion of the main body portion; and
- a connection portion that is bent and extended backward from an upper end of the bent portion and is configured to be mounted on the mounting portion of the first bus bar to be electrically connected to the first bus bar.

16. The battery module of claim 1, wherein a contact area is configured to allow a welding rod to establish electrical connection around the embossed protrusion in the branched structure.

17. The battery module of claim 9, wherein the branched structure includes an embossed protrusion protruding toward the one electrode terminal, and a contact area is set to allow a welding rod to establish electrical connection around the embossed protrusion in the branched structure.

18. The battery module of claim 9, wherein the first bus bar comprises a mounting portion at a front end portion of the main body portion to be in contact with a portion of the second bus bar.

19. The battery module of claim 12, wherein the second bus bar comprises:
- a bent portion that is vertically and upwardly bent and extended from a rear end portion of the main body portion; and
- a connection portion that is bent and extended backward from an upper end of the bent portion and is configured to be mounted on the mounting portion of the first bus bar to be electrically connected to the first bus bar.

20. The battery module of claim 10, a diameter of the embossed protrusion is less than a diameter of the welding rod in contact with the contact region.

* * * * *